United States Patent [19]
Burer

[11] Patent Number: 5,911,191
[45] Date of Patent: Jun. 15, 1999

[54] SHOCK ABSORBING SEAT PEDESTAL

[76] Inventor: Peter J. Burer, 10023 87th St. North, Largo, Fla. 33777

[21] Appl. No.: 08/926,086

[22] Filed: Sep. 2, 1997

[51] Int. Cl.[6] ........................................... B63B 17/00
[52] U.S. Cl. ........................................ 114/363; 297/344.18
[58] Field of Search ................................... 248/562, 565, 248/600, 623, 157, 101, 188.5; 297/344.12, 344.18, 344.19; 114/363

[56] References Cited

U.S. PATENT DOCUMENTS 2,893,470  7/1959  Peller ...................................... 248/565

*Primary Examiner*—Ed L. Swinehart
*Attorney, Agent, or Firm*—Harold D. Shall

[57] ABSTRACT

A pedestal made of inner and outer tubes with a pair of bearings carried by the inner tube and carrying the outer tube. The inner tube has elongated slots extending downwardly from the top end thereof with the top bearing having projections extending through these slots and into the inner tube. A spring shock absorber is connected at its lower end to the lower end of the inner tube and at its upper end to the projections on the top bearing. A pin releasably connects the outer tube to the top bearing for unitary movement.

9 Claims, 3 Drawing Sheets

SHOCK ABSORBING SEAT PEDESTAL

BACKGROUND OF THE INVENTION

1. Field of the Invention

This invention relates to adjustable seat pedestals generally and more particularly to such a seat pedestal including a vertical shock absorbing structure which will absorb the shocks inherent in heavy duty applications such as shocks encountered in watercraft operating in heavy seas or in a vehicle operating off-highway.

2. Description of the Prior Art

The prior art such as shown in U.S. Pat. Nos. 2,893,470; 5,309,861; and 5,116,016 show pedestals for seats which include shock absorbing arrangements including springs and shock absorbers for use in heavy duty applications. These prior art devices are very complex and/or do not provide the shock absorbing adjustable qualities that are provided by applicant with a simple yet very durable structure.

Operating a marine vessel in heavy seas or a vehicle in rugged off-highway conditions imposes very severe forces upon the operator. Standing in such situations is practically impossible so that the operator, from a practical standpoint much be seated or be thrown around uncontrollably. Even in mild seas, a vessel's operator is jarred substantially by the impact forces on the vessel. Since the operator ideally is seated during such operations, it is of utmost importance that the structure of the seat and the manner of attaching the same to the vessel will manage the loads being imposed therethrough to the operator at a comfortable level. To that end, the prior art, in the above mentioned patents, has also attempted to manage such loads to an acceptable level by utilizing a seat mounting structure or pedestal, which incorporates springs and shock absorber. However, the structures of the prior art are deficient in that they do not allow for adequate absorption of vertical loads while fore, aft and lateral loads on these prior art pedestals are not adequately managed so that such loads may result in friction which hinder the desirable damping of the severe vertical loads.

SUMMARY OF THE INVENTION

A pedestal is made of inner and outer tubes which are telescopically arranged. A lower low friction bearing is disposed between the bottom end of the outer tube and the lower end of the inner tube to space the tubes in a low friction manner. Vertical slots are provided in the top of the inner tube and a low friction bearing is disposed around the top end of the inner tube, with the bearing having inwardly projections that ride in the slots of the inner tube with the slots being long enough to allow for substantial relative vertical movement between the upper bearing and the inner tube with no relative rotation. A spring-shock absorber assembly is connected between the upper bearing and the lower end of the inner tube and outer tube is secured about the upper and lower bearing by a releasable pin connection to the upper bearing which prevents relative rotative and axial movement between the outer tube and upper bearing. A seat mounting plate is securely mounted on the upper end of the outer tube.

The bearings are preferably made of a low friction and durable material having at least the following characteristics: abrasion resistance, good tensile strength, energy absorption, resistance to stress cracking, low coefficient of friction, self lubrication and water repellant. A material having these characteristics has been used satisfactorily and is referred to as Ultra-High Molecular Weight Polyethylene Resin (UHMW). A source for such a material is Westlake Plastics Company of Lenni, Pa., and catalogued as Westlake LENNITE®. "LENNITE products are ideally suited for applications where durability and low friction are of paramount importance.—Because LENNITE shapes work harden, repeated impacts actually toughen them." (quotation from Westlake brochure)

DETAILED DESCRIPTION OF THE PREFERRED EMBODIMENT

Figure 1:
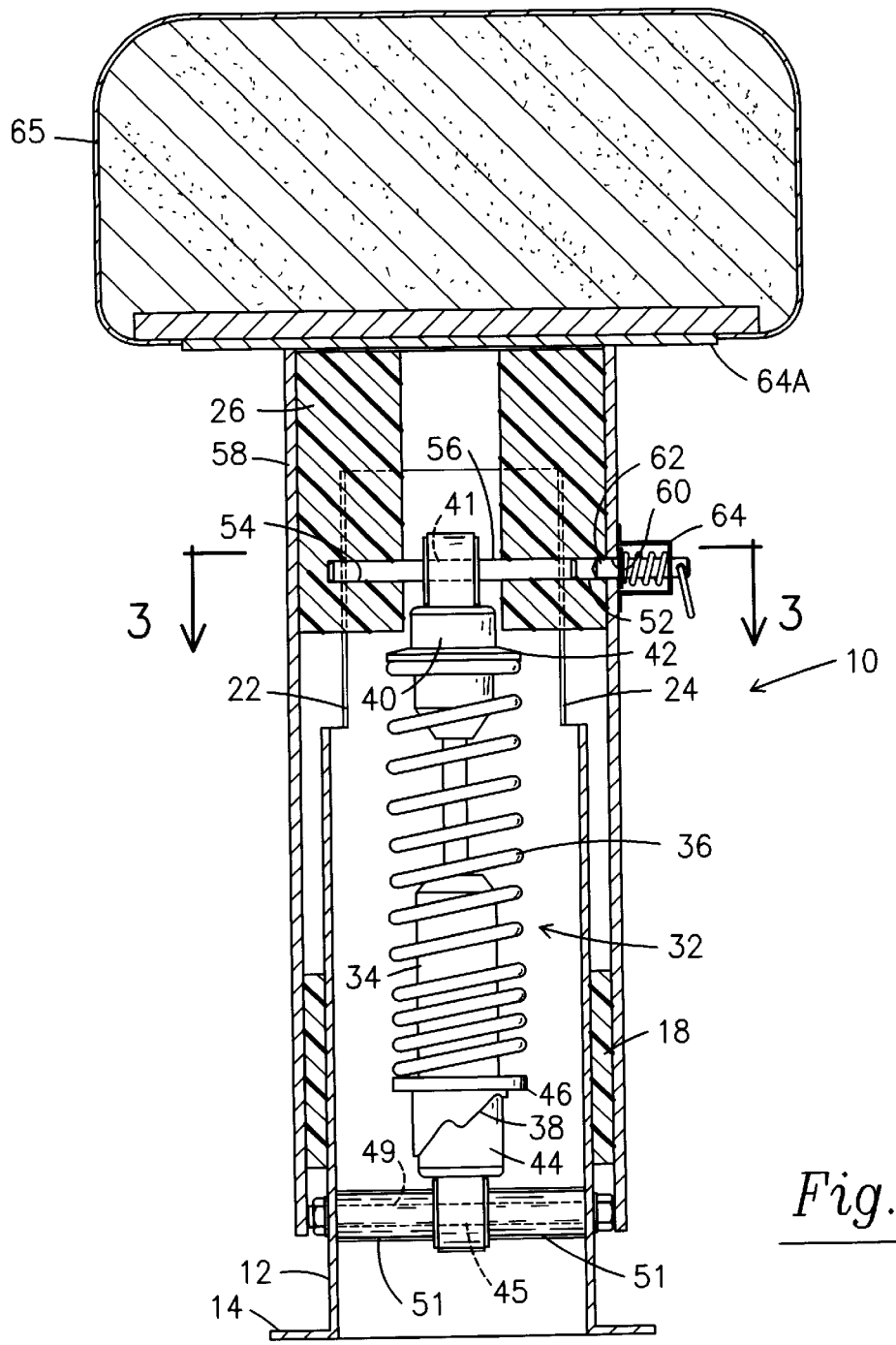
FIG. 1 is an elevation view in vertical cross section of a seat pedestal made according to my invention.
Figure 2:
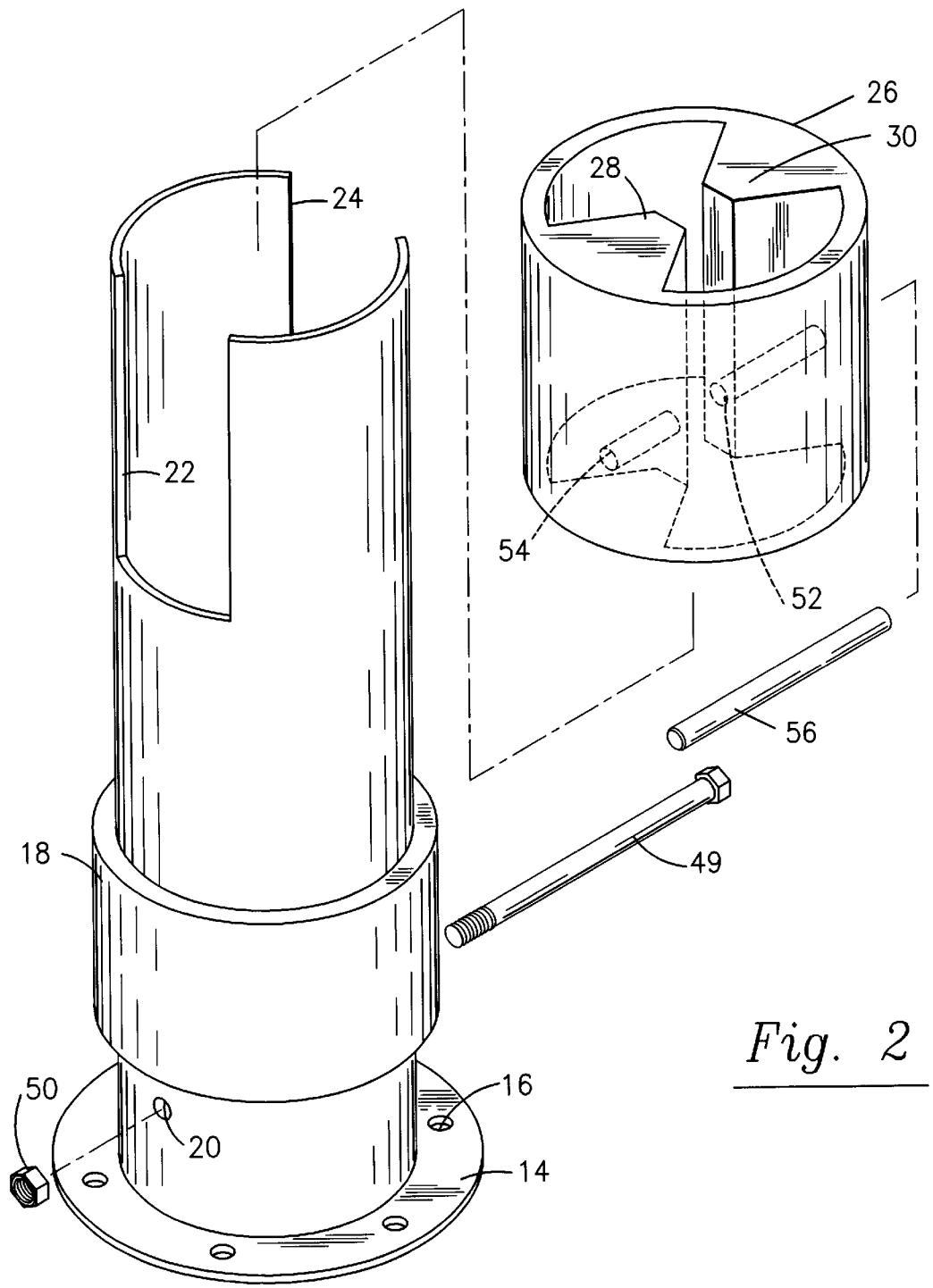
FIG. 2 is an exploded perspective view of the inner tube and the two bearings of the pedestal shown in FIG. 1.
Figure 3:
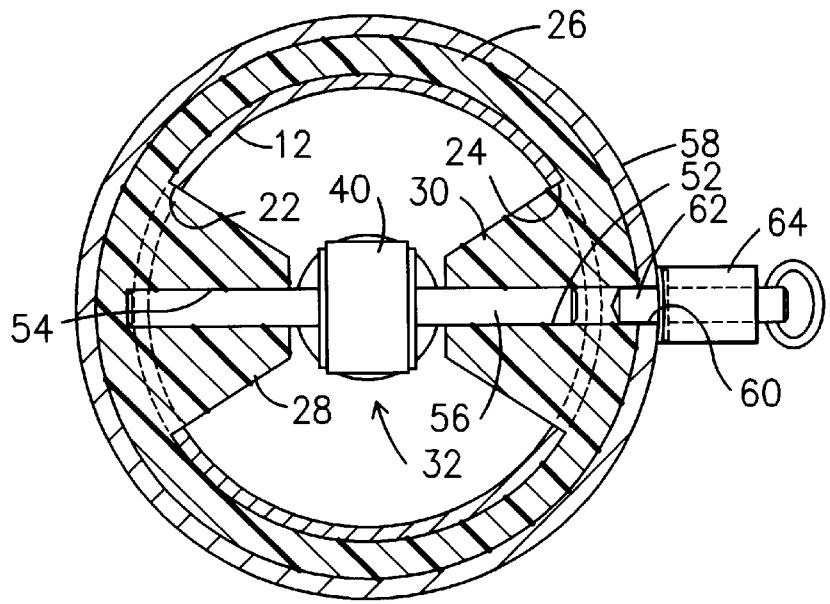
FIGS. 3 and 4 are cross sectional views taken along the line 3—3 in FIG. 1.

A pedestal is shown generally at 10 and includes an elongated vertically extending inner tube 12 having formed integrally pedestal 10 to the deck of a boat or the floor of a vehicle. An annular lower bearing 18, made of a low friction and durable material, surrounds the lower end of the tube 12 immediately above a pair of diametrically aligned bolt holes, one of which is seen at 20 in FIG. 2, formed in the tube 12 a short distance above the plate 14. The exact position of the holes 20 depend on the length of the tube 12, as is the relative position of the lower bearing 18.

The top of the tube 12 has a pair of diametrically opposed vertically extending slots 22 and 24 commencing at the top end of the tube and extending downwardly approximately one-third the length thereof; it being understood that the length of the slots are developed by the amount of telescoping encountered by the full compression of the shock absorber 32 and may be more or less than one-third (⅓) the length of the tube depending on the length of the tube selected for the height of the desired pedestal. An annular top bearing 26 is disposed about the end of the tube 12 and has a pair of diametrically opposed inwardly extending projections 28 and 30 registering with the slots 22 and 24 and extending therethrough with the vertical length of the projections being more than the vertical length of the slots 22 and 24 whereby the bearing 26 can move vertically relative to the tube 12, while the sides of the projections engage the sides of the slots to prevent relative rotation, and the projections may engage the bottom of the slots as a downward limitation.

Spring shock absorbing means are disposed in the tube 12 for controlling movement of the upper bearing 26 relative to the inner tube 12. More particularly, the shock absorbing means 32 includes a conventional adjustable shock absorber 34 and coil spring 36, with the lower end 44 of the shock absorber having a conventional length adjusting arrangement shown at 38 to "tune" the shock absorber. The shock absorber 32 can be of the gas or oil type and has an upper end 40 with a pin receiving cross hole 41 therein and a spring engaging shoulder 42 thereon, which shoulder engages the upper end of the compression coil spring 36, and has a lower end 44 with a bolt receiving cross hole 45 therein and a spring engaging shoulder 46 thereon, which shoulder engages the lower end of the coil spring 36.

A bolt 49 passes through the aligned openings 20 in the tube 12 and through the bolt hole 45 in the lower end 44 of the shock absorber 32, which bolt has a nut on the end thereof and pair of spacers 51 thereon, which spacers are disposed between the inner wall of the inner tube and the lower end 44 of the shock absorber 32 to center the lower end, to thereby secure the lower end 44 of the absorber 32 to the tube 12. The top bearing 26 has a pair of diametrically opposed pin receiving openings 52 and 54 therein, which are centered in the projections 30 and 28 respectively, with the pin openings 54 in the projection 28 being a blind opening and thereby being open only inwardly, and the opening 52 extending completely through the bearing 26, as can the pin opening 54 if desired. A cross pin 56 passes through the cross hole 41 of the shock absorber 32 by passing through the opening 52, the opening 41 and then into the opening 54 to thereby secure the shock absorber 32 to the top bearing 26. The projections 28 and 30 extend inwardly sufficiently to abut the sides of the end 40 of the absorber 32 in the event it moves laterally to substantially center the end 40 and control lateral movement.

Figure 4:
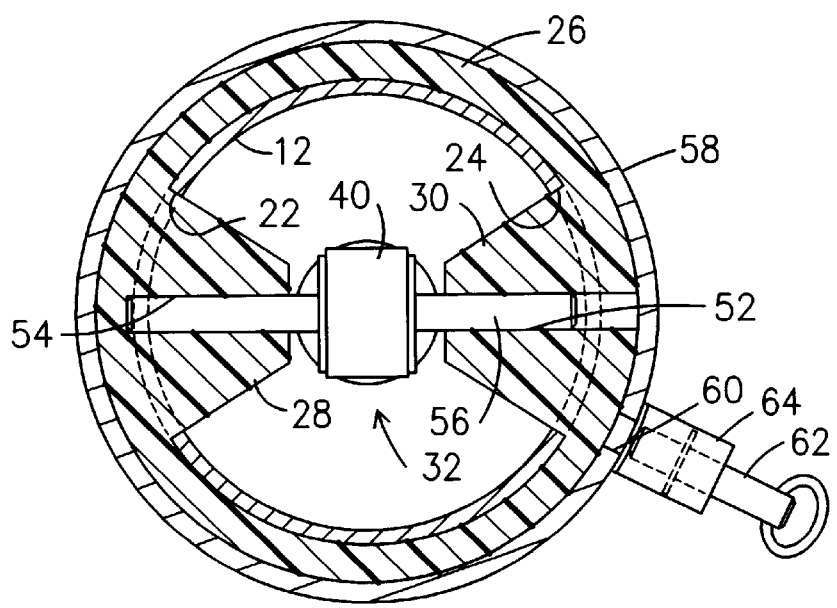

An outer tube 58 is fit over and closely received by the outer surface of the top and lower bearings 26 and 18. The tube 58 has an opening 60 registerable with the outer end of the opening 52 and the inner end of a lock pin 62 carried by the tube 58 is receivable in the opening 52 to lock the tube 58 to the bearing 26 against relative rotational and vertical movement. The pin 62 is conventionally spring loaded to move inwardly in a housing 64 fixedly secured to the outer tube 58, whereby, upon the pin moving outwardly, the tube may be rotated and/or moved vertically for disassembly, as shown in FIG. 4, the pin released, and upon the pin becoming in registration with the opening 52, the pin will be biased directly into the opening.

On top of the tube 58 is fixedly secured a mounting plate 64A. A seat 65 can be directly secured to the plate 64A as shown or it can be secured by a conventional fore and aft slider with or without a rotating arrangement, the latter two constructions not being shown. In order to give a better appeal to the appearance of the tube assembly while protecting the tubes, a resilient accordion type boot can be placed over the tubes. Additionally, the pedestal can not only be used singly with a seat as shown, but the pedestal can be used as a base for a bench, or a leaning post.

Although the above description relates to a presently preferred embodiment, numerous changes can be made therein without departing from the scope of this invention as claimed in the following claims.

What is claimed is:

1. A shock absorbing pedestal comprising
   A) a lower vertically extending tube including a mounting means on the bottom thereof,
   B) a top and a bottom bearing mounted on and adjacent the top and bottom ends of said tube, respectively, for low friction movement relative thereto,
   C) said lower tube having vertically elongated receiving means in the upper end thereof,
   D) projection means on said top bearing extending into said receiving means for relative vertical movement while abutting said receiving means and thereby being held against relative rotative movement,
   E) upper and lower securing means,
   F) vertically disposed and acting shock absorbing means disposed in said lower tube with the lower end thereof secured by said lower securing means to said lower tube and the upper end thereof secured by said upper securing means directly to said upper bearing,
   G) an upper supporting tube for supporting a seat on the top thereof and being disposed in telescopic relationship with said inner tube and supported by said bearings, and
   H) tube securing means securing said upper tube to said top bearing for unitary movement.

2. A shock absorbing pedestal according to claim 1 wherein said securing means secures said shock absorbing means directly to said projecting means of said top bearing.

3. A shock absorbing pedestal according to claim 2 wherein said top bearing has a pair of aligned openings therein and said securing means is a pin means disposed in said openings.

4. A shock absorbing pedestal according to claim 3 wherein said tube securing means securing said upper tube to said top bearing connects to said top bearing in one of said openings.

5. A shock absorbing pedestal according to claim 4 wherein said tube securing means is a spring loaded pin.

6. A shock absorbing pedestal according to claim 2 wherein
   A) both of said top and bottom bearings are annular and have a peripheral surface and are disposed about and received on the periphery of said lower tube and
   B) said upper tube is an outer tube received about the peripheral surface of said bearings.

7. A shock absorbing pedestal comprising
   A) a lower vertically extending tube including a mountings means on the bottom thereof,
   B) a top and a bottom bearing mounted on and adjacent the top and bottom ends of said tube, respectively, for low friction movement relative thereto,
   C) said lower tube having vertically elongated receiving means in the upper end thereof,
   D) projecting means on said top bearing extending into said receiving means for relative vertical movement while abutting said receiving means and thereby held against relative rotative movement,
   E) upper and lower securing means,
   F) vertically disposed and acting shock absorbing means disposed in said lower tube with the lower end thereof secured by said lower securing means to said lower tube and the upper end thereof secured by said upper securing means directly to said upper bearing,
   G) an upper supporting tube having an upper supporting surface thereon being disposed in telescopic relationship with said lower tube and supported by said bearings and movable downward unitarily therewith.

8. A shock absorbing pedestal according to claim 7 wherein said upper supporting surface supports a seat thereon.

9. A shock absorbing pedestal according to claim 7 including means securing said upper tube to said top bearing for unitary movement.

* * * * *